US008855436B2

(12) United States Patent
Bulan et al.

(10) Patent No.: US 8,855,436 B2
(45) Date of Patent: Oct. 7, 2014

(54) SYSTEM FOR AND METHOD OF SELECTIVE VIDEO FRAME COMPRESSION AND DECOMPRESSION FOR EFFICIENT EVENT-DRIVEN SEARCHING IN LARGE DATABASES

(75) Inventors: Orhan Bulan, Rochester, NY (US); Edgar A. Bernal, Webster, NY (US); Robert P. Loce, Webster, NY (US); Wencheng Wu, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 154 days.

(21) Appl. No.: 13/277,719

(22) Filed: Oct. 20, 2011

(65) Prior Publication Data

US 2013/0101171 A1    Apr. 25, 2013

(51) Int. Cl.
*G06K 9/36* (2006.01)
*G06K 9/46* (2006.01)
*H04N 19/107* (2014.01)
*H04N 19/172* (2014.01)
*H04N 19/139* (2014.01)

(52) U.S. Cl.
CPC ..... *H04N 19/00151* (2013.01); *H04N 19/0003* (2013.01); *H04N 19/00266* (2013.01)
USPC .......... 382/236; 382/103; 382/107; 382/232; 382/235; 382/238; 382/239; 382/243

(58) Field of Classification Search
USPC ......... 382/103, 105, 107, 232, 235, 236, 238, 382/239, 243; 348/169
See application file for complete search history.

(56) References Cited

U.S. PATENT DOCUMENTS

| 7,359,440 | B2 * | 4/2008 | Zhang et al. | 375/240.16 |
| 2003/0076881 | A1 * | 4/2003 | Akiyoshi et al. | 375/240.01 |
| 2004/0125984 | A1 * | 7/2004 | Ito et al. | 382/103 |
| 2009/0074080 | A1 * | 3/2009 | He et al. | 375/240.26 |
| 2009/0212929 | A1 * | 8/2009 | Drory et al. | 340/426.1 |
| 2011/0019026 | A1 * | 1/2011 | Kameyama | 348/222.1 |

OTHER PUBLICATIONS http://en.wikipedia.org/wiki/AMBER_Alert.
http://www.amberalert.gov/index.thm.
http://www.john-wiseman.com/technical/MPEG_tutorial.htm.
Gary J. Sullivan and Thomas Wiegand, "Rate-Distortion Optimization for Video Compression", IEEE Signal Processing Magazine, Nov. 1998, pp. 74-90.
B. K. P. Horn and B. G. Schunck, "Determining optical flow", Artificial Intelligence 17 (1981): 185-203.
B. D. Lucas and T. Kanade (1981), "An interative image registration technique with an application to stereo vision", Proceedings of Imaging Understanding Workshop, pp. 121-130.

(Continued)

*Primary Examiner* — Matthew Bella
*Assistant Examiner* — Julian Brooks
(74) *Attorney, Agent, or Firm* — MH2 Technology Law Group LLP

(57) ABSTRACT

A method of, and system for, selective video frame compression and decompression is presented. The disclosed technique is particularly suited for efficient event-driven searching in large databases. The technique involves designating certain frames in a video sequence as reference frames, to be compressed using a first compression technique, where the remaining frames are compressed using a second compression technique. The first compression technique may be implemented without requiring data from any neighboring frames.

12 Claims, 5 Drawing Sheets

(56) References Cited

OTHER PUBLICATIONS

Y. Huang and X. H. Zhuang, "Motion-Partitioried Adaptive Block Matching for Video Compression", International Conference on Image Processing, 1995.
Wren, Christopher R., Ali Azarbayefani, Trevor Darrell, and Alex Pentland, "Pfinder: Real-Time Tracking of the Human Body", In IEEE Transactions on Pattern Analysis and Machine Intelligence, Jul. 1997, vol. 19, No. 7, pp. 780-785.
Nir Friedman and Stuart Russell, "Image segmentation in video sequences: A probabilistic approach", In Proc. of the Thirteenth Conference on Uncertainty in Artificial Intelligence (UAI), Aug, 1-3, 1997.
C. Stauffer and W. E. L. Grimson, "Adaptive background mixture models for real-time tracking", In Proc. of the 1999 Conference on Computer Vision and Pattern Recognition (CVPR '99), pp. 2246-2252, 1999.
http://en.wikipedia.org/wiki/Block-matching_algorithm.
http://blog.watchmethink.com/2011/01/by-2012-90-of-data-will-be-video/.
http://interestingsnippets.tumblr.com/post/905661206/humans-generated-more-data-in-2009-than-in.

* cited by examiner

SYSTEM FOR AND METHOD OF SELECTIVE VIDEO FRAME COMPRESSION AND DECOMPRESSION FOR EFFICIENT EVENT-DRIVEN SEARCHING IN LARGE DATABASES

FIELD OF THE RELATED ART

The present disclosure relates to systems for and methods of video compression, and more particularly, to system for and methods of video compression that produce data suitable for searching.

BACKGROUND OF THE RELATED ART

It is often desirable to search large databases of compressed video for objects of interest. Such instances arise, for example, when authorities issue an AMBER ALERT, which apprises the public that a child under the age of seventeen has been abducted. An AMBER ALERT generally includes a description of a suspected captor's vehicle. Such a description may be used to search databases of traffic video content for the object of interest, in this case, a vehicle.

Prior art techniques for searching large video data databases include decompressing whole video sequences and performing the search within the decompressed video. However, this typically requires a significant amount of computational resources and time.

BRIEF DESCRIPTION OF THE DRAWINGS

Various embodiments of the present disclosure will be described herein below with reference to the figures wherein.

DETAILED DESCRIPTION

Reference will now be made in detail to embodiments of the present teachings, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

The present disclosure provides techniques for compressing video data such that the resulting compressed data may be efficiently searched. The disclosed techniques are particularly suited for efficient event-driven searching in large compressed-video databases. The techniques involve designating certain frames in a video sequence as reference frames, to be compressed using a first compression technique, while the remaining frames are compressed using a second compression technique. The first compression technique, and its corresponding decompression technique, may be implemented without requiring data from any neighboring frames.

Figure 1:
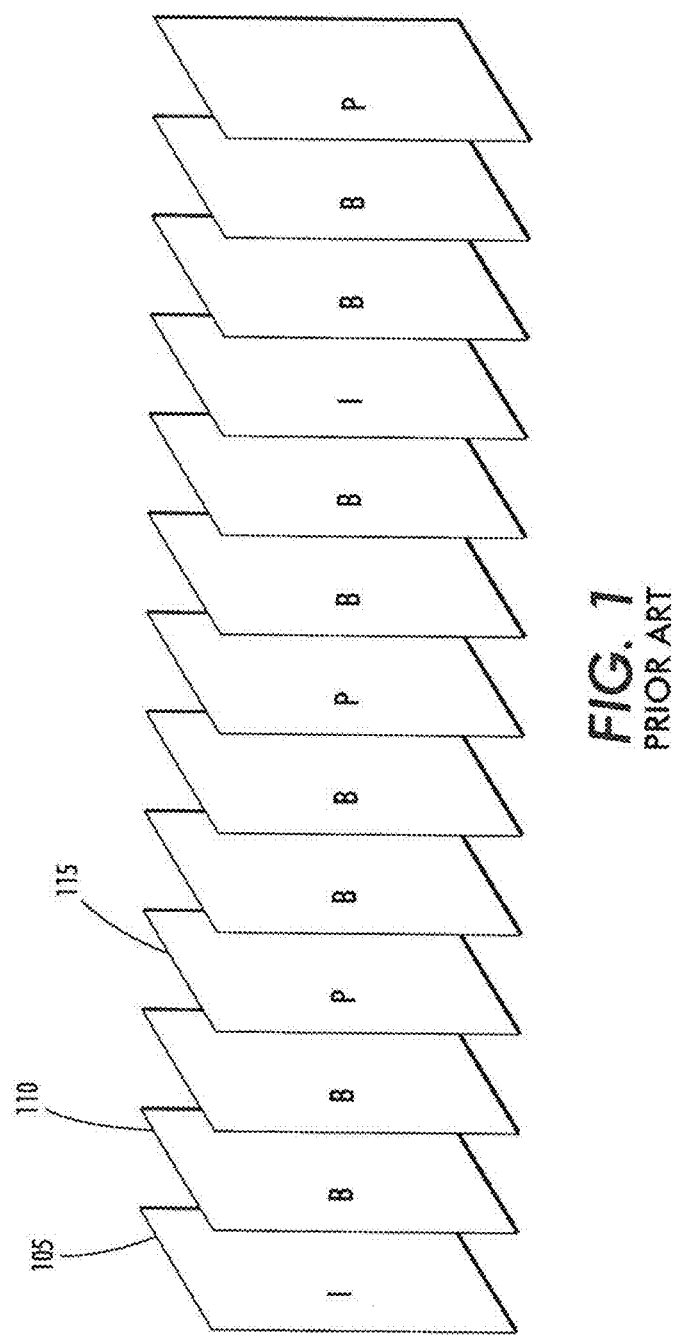
FIG. 1 is a schematic diagram of a prior art video compression technique.

FIG. 1 is a schematic diagram of a prior art video compression technique. Certain prior art video compression techniques (e.g., MPEG-1, MPEG-2, MPEG-4, H.261, H.263, H.264/AVC) rely on exploiting spatial and temporal correlation across video frames. Specifically, such techniques treat each video frame as either a reference frame ("Index Frame" or "I-frame") 105 or a non-reference frame. A non-reference frame may be a bi-directionally coded frame ("B-frame") 110, using prior and subsequent frames, or predictive coded frame ("P-frame") 115, using prior frames only.

I-frames 105 are treated as stand-alone images for purposes of compression. Such frames are compressed using image-compression-like techniques (e.g., techniques similar to JPEG, JPEG200) that do not require data from any other frames in the video sequence. Thus, I-frames 105 may be compressed and decompressed in isolation, without requiring information from any other video frame. Compression of I-frames is achieved by, for example, exploiting spatial redundancies between adjacent pixels within the target frame.

Non-reference B-frames 110 and P-frames 115 require information from surrounding video frames for purposes of compression. Compression of non-reference frames is achieved by exploiting temporal redundancies between adjacent frames. This is achieved by using inter-frame or motion-compensated prediction methods, where the target frame is estimated or predicted from previously encoded frames in a process that typically entails three steps. The first step, motion estimation, entails estimation of motion vectors with the help of previously encoded frames. The target frame is segmented into pixel blocks called target blocks, and an estimated or predicted frame is built by combining blocks from previously encoded frames that best match the target blocks. Motion vectors describe the relative displacement between the location of the original blocks in the reference frames and their location in the predicted frame. While P-frames 115 use only previous frames in the motion estimation, B-frames 110 require both previous and future frames for the first step. The second step calculates an error residual between the estimated frame and the target frame. The third step stores the error residual and the extracted motion vectors.

Decompressing a non-reference frame requires first decompressing the previous (and, for B-frames, subsequent) frames used in the motion estimation stage. This creates a sequential dependence among the frames for decompression purposes. The reference I-frames 105, however, can be decompressed individually, without requiring the other frames to be decompressed first.

Prior art video compression techniques typically select reference frames at a fixed rate (e.g., one reference frame per every thirty total frames), with an option to insert asynchronous reference frames for capturing significant scene changes. The reference frame rate affects compression efficiency, but does not overtly affect the quality of the resulting video. However, prior art compression techniques require a group of frames to be decompressed in order to search for an event of interest within a portion of a large database of compressed traffic videos. The search is then conducted on the resultant decompressed video.

Figure 2:
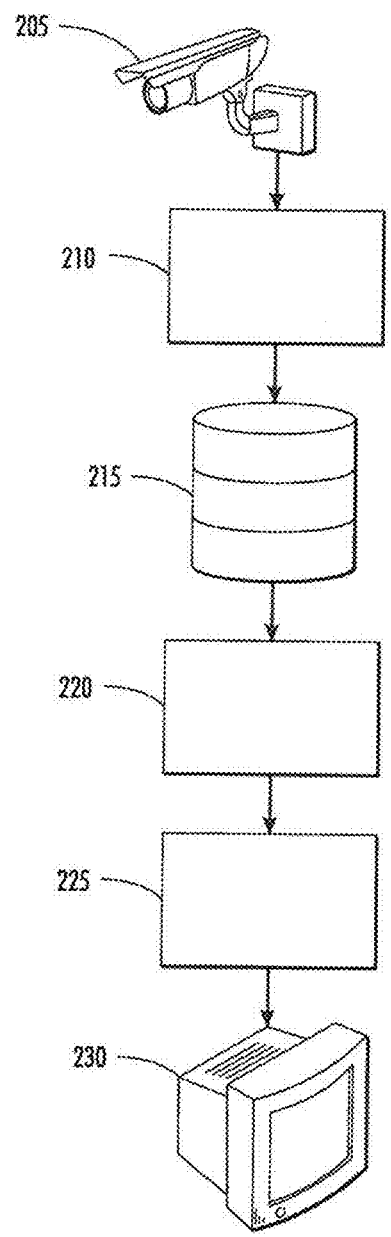
FIG. 2 is a schematic diagram of a system for video compression, in accordance with the present disclosure.

FIG. 2 is a schematic diagram of a system for video compression, in accordance with the present disclosure. The system includes camera 205, which may be, by way of non-limiting example, a closed-circuit camera set to monitor traffic. Camera 205 is operatively coupled to frame selection and compression logic 210. Frame selection and compression logic 210 may be a stand-alone computer executing software, may be firmware, hardware or any combination thereof. In other embodiments, frame selection and compression logic 210 is included in camera 205. Frame selection and compression logic 210 is communicatively coupled to persistent storage 215, which may take the form of, by way of non-limiting example, a hard disc drive, flash drive or a tape drive. Persistent storage 215 is communicatively coupled to decompression logic 220. Decompression logic 215 may be a stand-alone computer executing software, may be firmware, hardware or any combination thereof. Decompression logic 215 is communicatively coupled to search logic 225. Like decompression logic 220, search logic 225 may be a stand-alone computer executing software, may be firmware, hardware or any combination thereof. Search logic 225 is communicatively coupled to display device 230, which may be, by way of non-limiting example, a computer monitor. In some embodiments, any, or a combination, of frame selection and compression logic 210, decompression logic 220 and search logic 225 may be present in the same device, present in two devices, or present in three or more devices.

Figure 3:
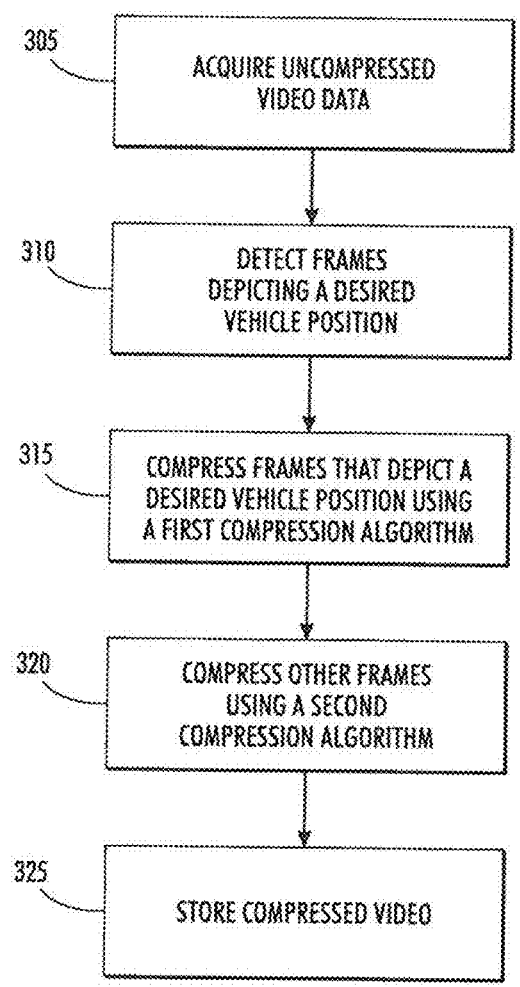
FIG. 3 is a flowchart of a video compression technique, in accordance with the present disclosure.

FIG. 3 is a flowchart of a video compression technique, in accordance with the present disclosure. The technique presented in reference to FIG. 3 may be implemented using, by way of non-limiting example, the system depicted in reference to FIG. 2. At block 305, raw, uncompressed video data is acquired. The data may originate directly from a camera, or may be retrieved from persistent or transient storage. At block 310, frames that depict a desired vehicle position are selected. (Although this document may refer to a "vehicle," such language is exemplary, as the disclosed techniques may be applied to any object, e.g., a human.)

The process of block 310 of selecting frames that depict a desired vehicle position is discussed in detail below in reference to FIG. 4.

At block 315, frames that were selected at block 310 are compressed using a compression technique that does not require data from surrounding frames. That is, frames selected at block 310 are compressed using a stand-alone compression technique (by way of non-limiting example, techniques similar to JPEG or JPEG2000) at block 315.

At block 320, the remaining frames are compressed using a different algorithm that may require data from preceding frames, subsequent frames, or both. Note that in some embodiments, some of the remaining frames are compressed as I-frames. This may be performed in order to account for, e.g., illumination drift, motion of the camera, or other movement of other objects in the frame.

Note that the techniques depicted in reference to blocks 310, 315 and 320 may occur in an order determined by an order of the frames. That is, as each frame is processed, a determination per block 310 may be made, then the frame may be treated according to one of blocks 315 and 320. The next frame in sequence may be processed in the same manner, and so on.

At block 325, the combined data from blocks 315 and 320 are stored in persistent storage, e.g., a hard disc drive or a tape drive.

Figure 4:
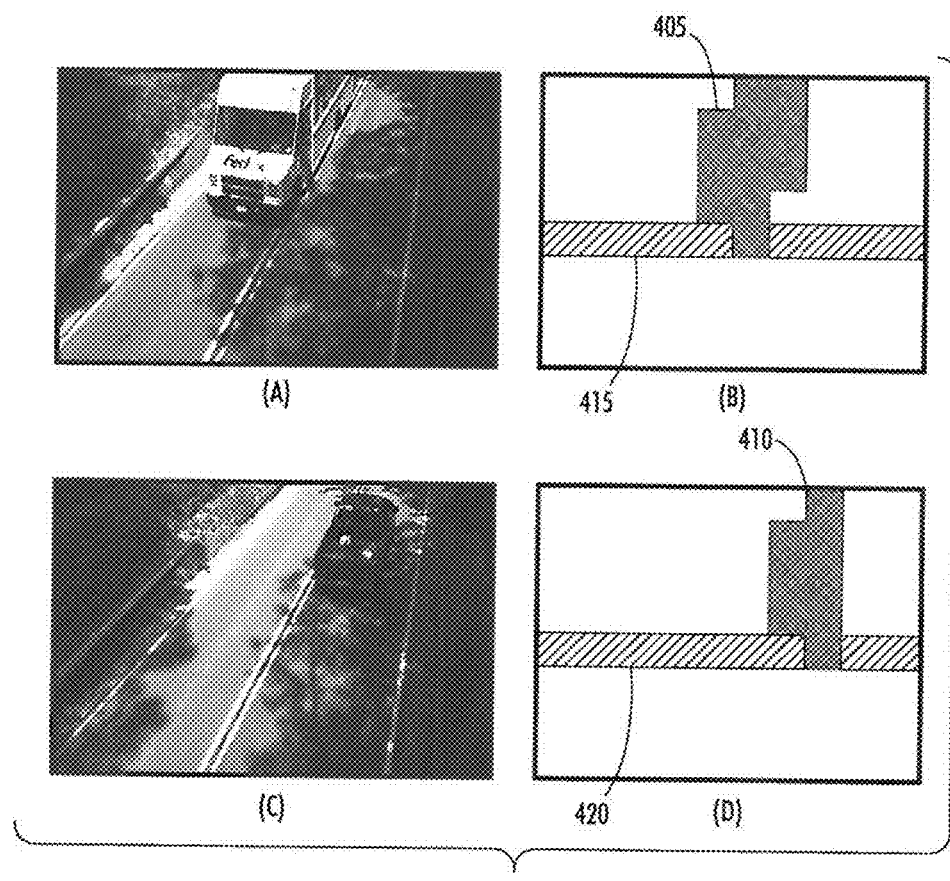
FIG. 4 depicts a frame selection technique, in accordance with the present disclosure.

FIG. 4 depicts a frame selection technique, in accordance with the present disclosure. The technique presented reference to FIG. 4 may be implemented using, by way of non-limiting example, the system depicted in reference to FIG. 2. In general, the frame selection techniques according to the present disclosure designate as reference frames those frames that depict a vehicle at a desired position within the frame. Here, "desired position" means a position that allows for automatic or manual recognition of some descriptive parameter (e.g., license plate number, partial license plate number, driver, passenger, vehicle make, vehicle model, etc.).

The frame selection technique of FIG. 4 utilizes motion vector extraction and detecting motion blocks on a virtual line. That is, motion vectors are used to detect a vehicle at a desired position in a frame in a video sequence as discussed presently. In FIG. 4, motion vectors between two adjacent frames in a video sequence are extracted using, by way of non-limiting example, a block-matching algorithm. A block-matching algorithm matches moving blocks between adjacent frames to extract motion vectors, and is used in several video compression algorithms (e.g., MPEG-4, H.264) for motion estimation. The block matching algorithm considered in FIG. 4 partitions the current frame into pixel blocks, called motion blocks. A search window is then defined in the current frame around the location of the motion block. A matching block is then determined in the search window corresponding to the motion block in the previous frame by using a block similarity criterion. Exemplary, non-limiting techniques for such determinations include mean squared error (MSE) and the mean absolute difference (MAD). Both MSE and MAD measure how dissimilar two blocks are, accordingly, a block similarity measure may be defined as MSE or MAD. The motion vector for the motion block may then be calculated as the two-dimensional vector that maximizes the block similarity measure, or minimize the MSE or MAD, between the blocks in the previous and current frames. Determining the vector that maximizes block similarity may proceed using, by way of non-limiting example, a full extensive search, a binary search, a three step search, a spiral search algorithm or a Monte Carlo technique.

Once the motion vector is determined, motion is considered detected when the magnitude of the extracted motion vector is larger than a suitably chosen threshold for a given motion block. Such motion blocks are referred to as "active" blocks and indicate the existence of a moving object in the blocks. FIG. 4(b) shows active motion block 405 corresponding to movement of the vehicle depicted in the frame of FIG. 4(a), and FIG. 4(d) shows active motion block 410 corresponding to movement of the vehicle depicted in the frame of FIG. 4(c). Thus, blocks 405, 410 indicate pixel positions where motion is detected.

I-frames are selected based on the presence and position of the active motion blocks in the frame. To that end, virtual lines 415, 420 are generated in the low resolution image of motion blocks. The direction of the virtual line may be chosen depending on the geometry of the road in the camera view. According to the embodiment of FIG. 4, a frame is considered a reference frame when a motion block is active for the first time in a given number of frames on the virtual line (this condition corresponds to the case when a vehicle enters the virtual line) or when a motion block is active for the last time on the virtual line after subsequent frames with active motion blocks on the line (this condition corresponds to the case when a vehicle exits the virtual line). Frames that do not meet these criteria are considered non-reference frames.

Although FIGS. 4(b) and 4(d) depict virtual lines, any virtual geometric figure may be used in the alternative. For two-way (or more) traffic, multiple virtual line segments may be used, based on the directions of the traffic flows. Such multiple virtual line segments can be set up manually for each traffic direction at the installation, or automatically learned from the existing video sequences using vehicle tracking methods.

Other techniques for determining which frames are to be designated as reference frames are contemplated. For example, a pixel-level optical flow technique may be employed. Pixel level optical flow techniques calculate the motion vectors for each pixel, rather than blocks, and are suitable alternatives to the technique discussed above in reference to FIG. 4.

Another technique for determining which frames are to be designated as reference frames is background subtraction coupled with moving object detection on a virtual line. Background subtraction is particularly suitable when the camera is static, as is the case for the cameras used in highways, toll booths, traffic lights, etc. When a background for a video sequence is obtained, the moving objects can be detected by subtracting the background image from the current frame. Based on the position of the moving vehicle with respect to the virtual line, the frame can be designated as a reference or non-reference frame. Suitable background selection techniques include those that track the variation of pixels over a time and calculate a temporal histogram of pixel values, identifying the most occurring pixel values as the background intensity.

Another technique for determining which frames are to be designated as reference frames is vehicle tracking across multiple frames using an object tracking technique. This approach may utilize feature extraction from all of the frames a vehicle stays in the scene and may determine a vehicle trajectory or path across the camera's field of view based on the tracking of the feature. Based on the estimated vehicle trajectory, the frame can be designated as a reference frame when the vehicle trajectory crosses, for example, the half point across the field of view of the camera. This approach is particularly suitable when video sequences are compressed in a workstation and not within the camera.

Yet another technique for determining which frames are to be designated as reference frames involves use of a slight delay after an impinging event. Certain embodiments may detect an object impinging on a virtual line (or the frame itself). After allowing a fixed predetermined number of frames to be captured, the next frame is automatically designated as an I-frame. This technique is particularly useful for monitoring traffic of a relatively constant velocity.

Yet another technique for determining which frames are to be designated as reference frames involves use of an impinging and an exiting event. Certain embodiments may detect an object impinging a virtual line (or the frame itself) and then leaving the virtual line (or the frame itself). A frame selected from the middle of the frames captured between the impinging and exiting events is designated as an I-frame. Note that this technique only designates a reference frame after several subsequent frames are captured.

Figure 5:
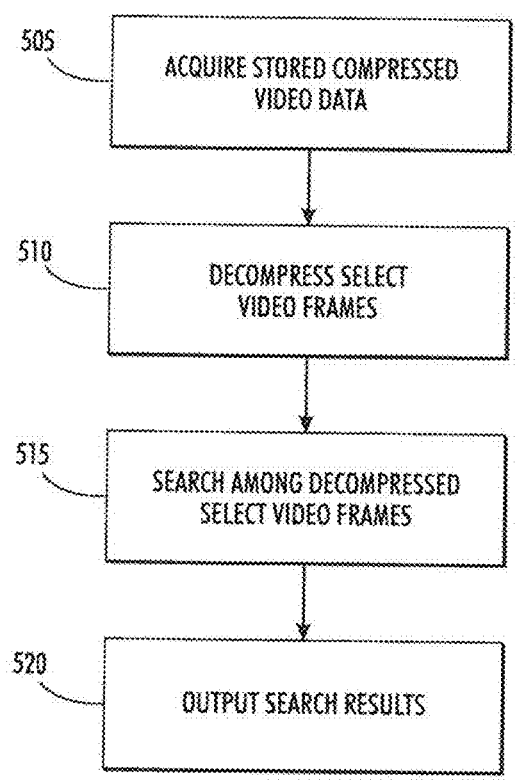
FIG. 5 is a flowchart of a video decompression technique, in accordance with the present disclosure.

FIG. 5 is a flowchart of a video decompression technique, in accordance with the present disclosure. The technique presented reference to FIG. 3 may be implemented using, by way of non-limiting example, the system depicted in reference to FIG. 2. At block 505, stored compressed video data is acquired. The data may be produced using the technique described above in reference to FIG. 3. The acquisition may be by way of retrieval from persistent or transient storage. At block 510, select video frames are decompressed. In some embodiments, only reference I-frames are decompressed at block 510.

Headers may be used to determine which frames are I-frames. Certain compression techniques, e.g., MPEG-1, MPEG-2, MPEG-4, H.261, H.263 and H.264/AVC, include a header for each collection of data representing a video frame. The header identifies the technique that was used to compress the data for that particular frame. The below Table sets for exemplary such header data.

TABLE

| Frame Mode | Header bits |
|---|---|
| I-Frame | 00 |
| P-Frame | 01 |
| B-Frame | 10 |

As depicted in the above Table, header bits of, e.g., "00" identify frames that were compressed using a stand-alone technique. Accordingly, at block 510, only those frames that were compressed using a stand-alone technique are decompressed. For data generated using the techniques discussed above in reference to FIG. 3, this means that only frames that depict a vehicle in a desired position are decompressed. At block 515, the decompressed frames are searched. The search may be for vehicles matching a description set forth in, by way of non-limiting example, an AMBER ALERT. Again by way of non-limiting example, such descriptions may include any, or a combination, of make, model, color, body type, license plate number and partial license plate number. Any algorithm capable of pattern recognition that is sufficient to identify the sought-after frames may be implemented. Alternately, a human may manually view the images. At block 520, the results of the search conducted at block 515 are output. Output may be in the form of display on a computer monitor, identification in a list form, or other techniques.

A benefit of the disclosed techniques is that only I-frames need to be decompressed in order to visually or automatically search for vehicles (or other objects) that are well positioned in a frame of video within a video database. Furthermore, the disclosed techniques allow for very high compression rates in low traffic conditions.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. The term "at least one of" is used to mean one or more of the listed items can be selected.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:
1. A method of selective video frame compression for vehicle event driven searching, the method comprising:
   acquiring electronically stored decompressed video data depicting at least one vehicle in motion, the video data representing a plurality of frames;
   detecting frames depicting a desired vehicle position, wherein the detecting frames comprises imposing a virtual geometric figure on each frame and detecting a motion vector of sufficient magnitude on the virtual geometric figure in a sufficient number of frames;

compressing each frame depicting a desired vehicle position using a first computer implemented compression technique that does not require other frames in the video data for compression, wherein the desired vehicle position comprises a position that allows for recognition of a license plate number of the vehicle;

compressing a plurality of frames not depicting a desired vehicle position using a second computer implemented compression technique that requires other frames in the video data for compression;

storing compressed video data for future investigation.

2. The method of claim 1 wherein the virtual geometric figure comprises one of a virtual line, a virtual freehand shape and a virtual polygon.

3. The method of claim 1 further comprising accessing compressed video data and decompressing only those frames that were compressed using the first computer implemented compression technique.

4. A system for selective video frame compression for vehicle event driven searching, the system comprising:

a persistent storage comprising electronically stored decompressed video data depicting at least one vehicle in motion, the video data representing a plurality of frames;

an electronic processor configured to detect frames depicting a desired vehicle position, wherein the desired vehicle position comprises a position that allows for recognition of a license plate number of the vehicle, wherein the detecting frames comprises imposing a virtual geometric figure on each frame and detecting a motion vector of sufficient magnitude on the virtual geometric figure in a sufficient number of frames;

an electronic processor configured to compress each frame depicting a desired vehicle position using a first computer implemented compression technique that does not require other frames in the video data for compression;

an electronic processor configured to compress a plurality of frames not depicting a desired vehicle position using a second computer implemented compression technique that requires other frames in the video data for compression; and a persistent storage comprising electronically stored compressed video.

5. The system of claim 4 wherein the virtual geometric figure comprises one of a virtual line, a virtual freehand shape and a virtual polygon.

6. The system of claim 4 further comprising an electronic processor configured to access compressed video data and decompress only those frames that were compressed using the first computer implemented compression technique.

7. A method of searching for a particular vehicle depicted in stored video data, the method comprising:

acquiring electronically stored compressed video data depicting at least one vehicle in motion, the video data representing a plurality of frames, the compressed video data comprising frames compressed using a first computer implemented compression technique that does not require other frames in the video data for compression and frames compressed using a second computer implemented compression technique that requires other frames in the video data for compression, wherein the frames compressed using the first computer implemented compression technique comprise frames detected as depicting the vehicle in a position that allows for recognition of a license plate number of the vehicle, wherein the frames detected as depicting the vehicle in a position that allows for recognition were detected by imposing a virtual geometric figure on each frame and detecting a motion vector of sufficient magnitude on the virtual geometric figure in a sufficient number of frames;

decompressing only those frames that were compressed using the first computer implemented compression technique, resulting in a plurality of decompressed frames; and searching for the particular vehicle in the decompressed frames.

8. The method of claim 7 wherein the virtual geometric figure comprises one of a virtual line, a virtual freehand shape, and a virtual polygon.

9. The method of claim 7 wherein the searching comprises searching for at least a portion of a license plate number.

10. A system for searching for a particular vehicle depicted in stored video data, the system comprising:

a persistent storage comprising electronically stored compressed video data depicting at least one vehicle in motion, the video data representing a plurality of frames, the compressed video data comprising frames compressed using a first computer implemented compression technique that does not require other frames in the video data for compression and frames compressed using a second computer implemented compression technique that requires other frames in the video data for compression, wherein the frames compressed using the first computer implemented compression technique comprise frames detected as depicting the vehicle in a position that allows for recognition of a license plate number of the vehicle, wherein the frames detected as depicting the vehicle in a position that allows for recognition were detected by imposing a virtual geometric figure on each frame and detecting a motion vector of sufficient magnitude on the virtual geometric figure in a sufficient number of frames;

an electronic processor configured to decompress only those frames that were compressed using the first computer implemented compression technique, resulting in a plurality of decompressed frames; and an electronic processor configured to search for the particular vehicle in the decompressed frames.

11. The system of claim 10 wherein the virtual geometric figure comprises one of a virtual line, a virtual freehand shape, and a virtual polygon.

12. The system of claim 10 wherein the electronic processor configured to search for the particular vehicle in the decompressed frames is further configured to search for at least a portion of a license plate number.

* * * * *